United States Patent
Kai et al.

(10) Patent No.: US 7,304,105 B2
(45) Date of Patent: Dec. 4, 2007

(54) HIGH-DENSITY COMPOSITE MATERIAL

(75) Inventors: Yasunao Kai, Fukuoka (JP); Masahiro Yamauchi, Fukuoka (JP); Kenji Okamura, Fukuoka (JP)

(73) Assignee: Nippon Tungsten Co., Ltd., Fukuoka (JP)

( * ) Notice: Subject to any disclaimer, the term of this patent is extended or adjusted under 35 U.S.C. 154(b) by 370 days.

(21) Appl. No.: 10/490,493

(22) PCT Filed: Sep. 30, 2002

(86) PCT No.: PCT/JP02/10168

§ 371 (c)(1),
(2), (4) Date: Apr. 19, 2004

(87) PCT Pub. No.: WO03/029343

PCT Pub. Date: Apr. 10, 2003

(65) Prior Publication Data

US 2005/0004290 A1    Jan. 6, 2005

(30) Foreign Application Priority Data

Sep. 28, 2001    (JP) .............................. 2001-303341

(51) Int. Cl.
*C08K 3/10* (2006.01)

(52) U.S. Cl. ..................... 524/406; 524/81; 524/401

(58) Field of Classification Search .................. 524/81, 524/401, 406
See application file for complete search history.

(56) References Cited

U.S. PATENT DOCUMENTS

| 5,276,080 | A | * | 1/1994 | Oku .......................... 524/432 |
| 5,908,884 | A | | 6/1999 | Kawamura et al. |
| 6,576,697 | B1 | * | 6/2003 | Brown, Jr. .................. 524/401 |

FOREIGN PATENT DOCUMENTS

| JP | 10-153687 | 6/1998 |
| JP | 2001-183100 | 7/2001 |
| JP | 2001-187829 | 7/2001 |

* cited by examiner

*Primary Examiner*—Peter D Mulcahy
(74) *Attorney, Agent, or Firm*—Jordan and Hamburg LLP

(57) ABSTRACT

A composite material which comprises an elastomer or vulcanized rubber and particles of a high-density material, such as tungsten, evenly dispersed therein, wherein the contents of the elastomer or vulcanized rubber and the high-density particles are 35 to 50 vol. % and 50 to 65 vol. %, respectively, based on the whole composite material, and the high-density particles have a particle composition comprising 60 to 80 vol. % coarse particles having a particle diameter of 10 to 100 μm, 10 to 20 vol. % medium particles having a particle diameter of 3 to 6 μm, and 10 to 20 vol. % fine particles having a particle diameter of 1 to 2 μm, the spaces among the coarse particles being filled with the medium particles and fine particles. The composite material is excellent in flexibility and processability and is suitable for use as a radiation-shielding sheet material, weight member, vibration-damping material, balancing member, radiating material, and shot material.

11 Claims, 2 Drawing Sheets

HIGH-DENSITY COMPOSITE MATERIAL

TECHNICAL FIELD

The present invention relates to a flexible high-density composite material for use as nuclear-radiation-shielding material, vibration-insulating material, material of weights, material of balance members, heat-dissipation material, material of slugs, etc.

BACKGROUND ART

A high-density material is used for various purposes. As one typical application, it is widely used as a nuclear-radiation-shielding material. In radiation treatments or radiation-based measurements, a portion of a subject having no need for radiation exposure is covered by a shield member for shielding radioactive rays. Lead has heretofore been used as the material of such a shield member, in view of its advantages, such as high radiation-shielding effect, low cost and excellent workability. However, lead itself has harmful effects on the human body, and involves issues related to environmental pollution.

In order to provide an alternative material for solving the problem of lead, there has been proposed a high-density metal excellent in deformability and workability, particularly, a complex of tungsten and rubber-like organic material. For example, Japanese Patent Laid-Open Publication No. 10-153687 discloses a flexible material having a high density of 9 g/cm$^3$ or more, which is prepared by mixing rubber with other organic materials. While this invention is intended to achieve increased density by use of two kinds of high-density powders different in mean particle size, the obtained material is lower in density and inferior in radiation-shielding function as compared to the conventional lead.

In addition to the use for a nuclear-radiation-shielding material, a high-density material is also used as a vibration-insulating material or a weight for maintaining the balance of an object. In terms of the use for such a vibration-insulating material or a balancing weight, the high-density material disclosed in the above material is insufficient in density, flexibility and workability.

DISCLOSURE OF INVENTION

In view of the above circumstances, it is therefore an object of the present invention to provide a composite material having a density of 10 g/cm$^3$ or more, which is equivalent to the density of the conventional lead or other high-desity metals, and enhanced flexibility and workability.

It is another object of the present invention to provide a high-density composite material having high-radiation-shielding ability and excellent formability and workability without any environmental issues.

It is still another object of the present invention to provide a flexible high-density compound material excellent in cost performance, handleability, safety in handling, heat resistance and chemical resistance, and usable as a material for a member to be used at a movable region, such as balance members or vibration-insulating members.

In order to achieve the above objects, the present invention provided a composite material comprising an elastomer or vulcanized rubber, and high-density particles dispersed over said elastomer or vulcanized rubber. In the composite material, the elastomer or vulcanized rubber and the high-density particles are contained, respectively, at 35 to 50 volume % and 50 to 65 volume % with respect to the total volume of the composite material. Further, the high-density particles include 60 to 80 volume % of first particles each having a particle size in the range of 10 to 100 μm, 10 to 20 volume % of second particles each having a particle size in the range of 3 to 6 μm; and 10 to 20 volume % of third particles each having a particle size in the range of 1 to 2 μm. The second and third particles are packed in respective spaces between the first particles.

In the above composite material, the high-density particles are tungsten.

The composite material of the present invention will be specifically described by taking one case where tungsten is used as a material of the high-density particles, as an example.

In a process of mixing metal or ceramic powder with organic high polymer to form a composite material, a mixing performance and formability are enhanced as these raw materials have higher flowability. The flowability of the composite material comes under the influence of the ratio and particle size of the powder, and higher flowability can be obtained as the ratio of the powder is reduced and/or the particle size of the powder is increased. For the purpose of obtaining a higher density in the composite material, it is conceivable to increase the ratio of the powder. However, if the ratio of the powder is simply increased, resulting deteriorated flowability will cause difficulties in obtaining an intended composite material. While the particle size of the powder can be increased to obtain desirable flowability, if only a powder having a large particle size is used, a number of spaces V will be created between the large particles as shown in FIG. 1. Even if two kinds of particles, or large-size particles A and medium-size particles B, are used as disclosed in the aforementioned Japanese Patent Laid-Open Publication No. 10-153687, the spaces V between the large-size particles A cannot be sufficiently infilled with the medium-size particles B, and the densification of the composite material can be achieved only in a limited range.

The present invention has been made based on the new knowledge that if medium-size particles B and small-size particles C are packed between large-size particles A at a given ratio, the mixing ratio of powder can be increased while marinating desirable flowability to obtain a desirable packing state and achieve a high-density composite material. Specifically, when a large-size particle, a medium-size particle and a small-size particle are used at specific particle sizes defined for the respective particles, excellent flowability can be obtained to provide a high-density composite material with excellent characteristics and high quality free from internal defects and gas bubbles.

In case where the high-density composite material is formed in a sheet-shaped member requiring flexibility, such as a nuclear-radiation shield, the particle size of tungsten particles evenly dispersed over the elastomer or vulcanized rubber has an upper limit of 100 μm for maintaining desirable flexibility of the sheet-shaped member. If the particle size simply becomes greater than 100 μm, the bendability of the obtained sheet-shaped member will be deteriorated and cracked. In order to maintain adequate flexibility, it is required to set the particle size of the large-size particles in the powder in the range of 10 to 100 μm.

Considering the packing performance of the particles, in case where only large-size particles having the same particle size are used, the closest packing state can be obtained when the particles are packed in a hexagonal grid-shaped arrangement, so-called hexagonal-packing arrangement. While a face-centered cubic structure is also one of the closest packing forms in theory, this structure cannot be practically achieved.

Assuming that the respective particles are ideally packed in hexagonal-packing arrangement as the closest packing form, the optimal packing density of the particles can be increased up to about 74%. The density corresponds to about 14.2/cm$^3$ for tungsten particles. When such particles are mixed with resin or the like, and formed as a composite material, the resin fills the spaces V between the close-packed large-size, medium-size and small-size particles A, B, C. Thus, the above density is further increased by about 0.1 to 0.4 cm$^3$.

However, when the tungsten particles are mixed with elastomer or vulcanized rubber to form a composite material, an intended density cannot be obtained due to irregularity in the shape of the particles, and a microscopic space formed between each of the particles and the elastomer or vulcanized rubber infiltrated between the particles. For example, in case where the composite material contains an elastomer having a density of about 1 g/cm$^3$ at 41 volume %, an actually obtainable density is not more than about 9 g/cm$^3$. In an actual experimental test using tungsten particles having a particle size in the range of 10 to 100 µm, an obtained density has a slightly different value but the same level of value for the above reason. This means that even if particle having an uniformed particle size, which are prepared using a conventional spray dryer or the like, are used, any density greater than the above value cannot be obtained due to irregularity in the arrangement and shape of the particles, adhesion with the elastomer, and gas bubbles in the elastomer.

Further, each of the tungsten particles mixed with the elastomer has fine bubbles attached on the surface there. These bubbles remain even after the tungsten particle is treated with a surface-active agent. If the particle has a smooth surface, a large number of the bubbles are attached on the surface in the form of a thin film. Thus, even if the weight of the tungsten particles is maintained at the same value, the tungsten particles having a reduced particle size cause increase in the number of bubbles due to increased specific surface area, and consequently a desirably increased density cannot be obtained. For example, if tungsten particles prepared as fine particles having a mean particle size of about 0.5 µm are mixed with an elastomer having a density of about 1 g/cm$^3$, a compound can be obtained only at a density of about 7.5 g/cm$^3$. Thus, it is desired that a fine particle having a particle size of less than 0.5 µm is not mixed.

While it is desirable to ideally pack the tungsten particles in the closest packing form of the hexagonal grid-shaped arrangement as described above, this arrangement involves the same problem of spaces created between the particles. In the present invention, it is contemplated that second particles each having a particle size approximately equal to the size of the space are added to allow the spaces to be filled with the particles so as to provide enhanced density, and third particles each having a particle size less than that of the second particles are further added to allow the spaces between the second particles so as to provide more enhanced density. In this case, it is also undesirable to include a particle having a particle size of less than 0.5 µm in an excessive number, for the aforementioned reason.

Thus, for obtaining an ideal packing state to solve the above problem, in the present invention, tungsten particles includes: 60 to 80 volume % of first particles each having a particle size in the range of 10 to 100 µm; 10 to 20 volume % of second particles each having a particle size in the range of 3 to 6 µm, wherein the volume % and the particle size are arranged to allow the second particle to be sufficiently packed in the spaces between the first particles; and 10 to 20 volume % of third particles each having a particle size in the range of 1 to 2 µm, wherein the volume % and the particle size are arranged to allow the third particles to be sufficiently packed in the spaces between the first and second particles. These tungsten particle are mixed with an elastomer or vulcanized rubber capable of filling the spaces between the first, second and third particles and coupling them together, so as to provide flexibility to the composite material.

When the ratio of the first particles:the second particles:the third particles is calculated based on a model in the ideal state, the particle-size ratio is about 100:22:7, and the volume ratio is about 100:1:0.4. However, each of the actual particles has a non-spherical irregular shape, a rough surface, and an uneven particle size, and these particles are dispersed over the elastomer. Thus, each of the spaces between the first particles has a larger volume than that in the model, and therefore the ranges of volume % defined as above are suitable for actual particles.

A typical polymeric material such as plastics is not suitable for obtaining flexibility in a high-density composite material, because the polymeric material itself is hard, and its increased thickness causes degradation in deformability. Thus, it is requited to use an elastomer or vulcanized rubber having flexibility. The elastomer or vulcanized rubber contained in the composite material forms a network around the packed particles while maintaining its elasticity and extensibility, to keep up the flexibility of the composite material.

Preferably, a styrene-based thermoplastic elastomer or an olefin-based thermoplastic elastomer is used as the elastomer. These elastomers can facilitate to obtain a high-density composite material having desirable flexible and excellent formability.

Among elastomers, the styrene-based thermoplastic elastomer is particularly excellent in flexibility, and low in softening temperature. Thus, a composite material composing the styrene-based thermoplastic elastomer and the high-density particles mixed therewith at a high mixing ratio can achieve high density and enhanced flexibility. In addition, this elastomer having thermoplasticity can be recycled or regenerated to reduce an amount to be discarded after use. Specifically, the styrene-based thermoplastic elastomer may include styrene/isoprene copolymer, hydrogenated styrene/isoprene copolymer, styrene/butadiene copolymer, hydrogenated styrene/butadiene copolymer, styrene isoprene/butadiene copolymer, and hydrogenated styrene isoprene/butadiene copolymer.

The olefin-based thermoplastic elastomer is excellent in flexibility, formability because of its low softening temperature, oil resistance, heat resistance and tensile strength, to allow the high-density composite material to be formed with both flexibility and strength. In addition, this elastomer having thermoplasticity can be recycled or regenerated to reduce an amount to be discarded after use. Specifically, the olefin/based thermoplastic elastomer may include: ethylene/butene copolymer; propylene/butene copolymer; ethylene/propylene copolymer; butene or ethylene/propylene or α-olefin copolymer; and amorphous ethylene/propylene copolymer.

Further, various additives including: a commonly used resin, such as ABS resin, polystyrene resin, polycarbonate rein; a flame retardant; a viscosity improver; and an ozone-resistant agent, may be added to the elastomer to adjust hardness and/or strength and produce an article, such as nuclear-radiation-shielding member, having flame resistance or ozone resistance at a low cost.

In case of using the vulcanized rubber, it is not limited to a specific type, but fluorine rubber is preferably used as the vulcanized rubber. The vulcanized rubber can be used to allow the high-density material to be used as the material of a sheet-shaped member having: capability of being used under an average temperature of 200° C.; resistance against most organic solvents and chemicals except for ketone; and elastic deformability. The vulcanized rubber prepared by using peroxide as its vulcanizing agent can provide a sheet-shaped member suitable as a nuclear-radiation shield excellent in chemical resistance. Further, the vulcanized rubber prepared by using polyol as its vulcanizing agent can provide a sheet-shaped member suitable as a nuclear-radiation shield excellent particularly in heat resistance. In addition to fluorine rubber, the vulcanized rubber may include: silicon rubber and ethylene/propylene rubber which have a higher heat resistance than that of commonly used resins; nitrile rubber having high oil resistance; and natural rubber, isoprene rubber and styrene/butadiene rubber which are advantageous in cost. These rubbers may be selectively used depending on the environment where the high-density composite material is used.

Generally, an elastomer or vulcanized rubber itself has difficulties in cutting. However, the elastomer or vulcanized rubber incorporated in the high-density composite material together with the high-density particles is formed in a network structure having a number of micro cracks. Thus, the elastomer or vulcanized rubber can be readily cut to provide excellent workability in cutting. In case of using a thermoplastic elastomer as the elastomer, it can be heated to cause plastic deformation so as to obtain a desired shape without any difficulties. The thermoplastic elastomer has another advantage of allowing the high-density compound material to be readily joined to another member through a thermo-compression bonding process so as to provide excellent installation performance in the actual use of the high-density compound material.

The high-density compound material of the present invention has a density of 10 g/cm$^3$ which is sufficient for the material of vibration insulators and weights, and can be obtained a higher density according to need by adjusting the mixing ratio of the elastomer and/or the vulcanized rubber. The density of 10 g/cm$^3$ equivalent to that of lead can provide a sufficiently high effect as wrights. The performance of vibration insulators or weights is primarily determined by their density. Thus, the high-density compound material used as the material of vibration insulators or weights can provide significantly excellent characteristic therein.

Tungsten has a high γ-ray absorption coefficient (cm$^{-1}$) of about 1.0 when the energy of γ-ray is 1.5 MeV to provide a high radiation-shielding performance. This value is sufficiently high as compared to the γ-ray absorption coefficient (cm$^{-1}$) of lead which is about 0.6 when the energy of γ-ray is 1.5 MeV. Further, as compared to a case of using a lead alloy, the high-density compound material of the present invention having substantially no adverse affect on environment and human body can provide a clean and safety product.

In comparison between compound materials having the same elastomer or vulcanized rubber and different particles, the high-density compound material of the present invention prepared by mixing the three types of particles different in average particle size can increase the ratio of the particles to the entire material to provide enhanced radiation-shielding performance.

Further, the high-density compound material of the present invention formed as a mixture of the high-density particles and various kinds of elastomer or vulcanized rubber has a structure where the mixed particles are incorporated into the various kinds of elastomer or vulcanized rubber, or has flexibility in its entirety. This provides enhanced handleability or usability in the use as a nuclear-radiation shied to allow a high radiation-shielding performance to be obtained in a limited space. In addition, the flexibility can prevent damages of the nuclear-radiation shied due to shock or vibration.

The high-density compound material having flexibility in its entirety can also be brought into close contact with a base member having an irregularly curved surface by taking advantage of its elastic deformability. In particular, if the high-density compound material is formed in a sheet shape, it can be effectively used even in a narrow space, or can be readily cut to form a desired shape.

The volume ratio of the elastomer or vulcanized rubber to the entire high-desity compound material, and the volume ratio of the high-density particles to the entire high-desity compound material are also critical to obtain the above characteristic of the high-density compound material. Specifically, the mixing ratio of the elastomer or vulcanized rubber is required to be in the range of 35 to 50 volume %, and the mixing ratio of the high-density particles is required to be in the range of 50 to 65 volume %. Even in case of using an elastomer or vulcanized rubber having a density reduced to the utmost, if the high-density compound material contains greater than 65 volume % of particles, the particles cannot be fully incorporated into the elastomer or vulcanized rubber, and the elastic deformability of the material in its entirety cannot be maintained. While the mixing ratio of the particles in the high-density compound material of the present invention can be reduce to allow the characteristic of the material to get close to that of the elastomer or vulcanized rubber so as to achieve higher flexibility, it is required to set the mixing ratio of the particles at 35 volume % or more to assured the intended density. Further, if the mixing ratio of the particles is greater than 50 volume %, the elastomer or vulcanized rubber residing around the particles cannot be formed in a desirable network structure, and the strength and flexibility of the high-density compound material cannot be adequately maintained.

In addition to the above characteristic, the high-density compound material of the present invention also exhibit characteristics suitable as a high-heat-conductive heat-dissipation material. Generally, a resin or rubber product having low heat conductivity cannot be used as a component, such as electronic components, requiring a heat dissipation characteristic. In contrast, the compound material of the present invention having a high-heat-conductive metal or ceramics packed therein at a high density can exhibit excellent characteristics as a heat dissipation material, such as improved heat conductivity and flexibility.

Further, the high-density compound material of the present invention can be used as the material of slugs for use in hunting, trapshooting or the like. The martial of slugs is required to have a high density and deformability. While lead has been used as the material of slugs, it involves problems of environmental ground pollution and harmful affect on animals. The high-density compound material of the present invention can provide slugs having a density and flexibility equivalent to those of lead without any adverse affect on environments.

Furthermore, the high-density compound material of the present invention can be formed to have a surface electrical resistance in the range of $10^2$ to $10^9$ Ω·cm, or semiconductivity. Thus, the high-density compound material can be used as anti-electrostatic discharge (ESD) materials capable of gradually discharging electrostatic without electrical breakdown in electronic devices.

In a process of producing the high-density compound material of the present invention, it is preferable that three kinds of particles different in particle size, i.e. first or large-size particles, second or medium-size particles and third or small-size particles, are formed as a mixed powder in advance, and then the powder is mixed with the elastomer or vulcanized rubber.

The mixed powder may be prepared by controlling the respective particle sizes of the three kinds of particles based on a given classification, and mixing and uniformly dispersing the powders by a blender, or by mixing and uniformly dispersing three kinds of particles different in average particle size by a blender. In order to obtain large-size particles, medium-size particles and small-size particles in a given particle size mix, it is preferable to prepare large-size particles classified at 10 to 100 μm, medium-size particles classified at 3 to 6 μm, and small-size particles classified at 1 to 2 μm, in advance, in a granulation stage of particles, and then mixed them. This process is most desirable to control the particle sizes.

Then, the obtained mixed powder is mixed with the elastomer or vulcanized rubber.

When a thermoplastic elastomer is used as the elastomer, the mixed powder is kneaded using a kneader or two-axis mixing screw in a molding apparatus. The obtained high-density compound material may be molded into various shapes, such as pellet, block, sheet, wire and pipe, using various molding apparatuses, such as press molding, extrusion molding, and roll molding. The high-density compound material may also be molded into a continuous sheet through T-die extrusion or calender roll, or molded into a product having a complicated shape, using an injection-molding machine, or embeddingly or integrally moulded with a metal component.

When a thermosetting or cross-linked elastomer is used as the elastomer, the mixed powder is kneaded using a roll kneader, pot mill or mixer, and then an obtained composite material is molded into various shapes, such as block, sheet, wire and pipe, using a press, calender roll, extrusion molding machine, or injection-molding machine. Further, the composite material may be molded into a product having a complicated shape, using a transfer-molding machine or injection-molding machine, or embeddingly or integrally moulded with a metal component.

When the vulcanized rubber is used, a rubber material is prepared by mixing an appropriate amount of additive, such as vulcanizing agent, vulcanization accelerator, softener or reinforcing agent, with unvulcanized rubber, and then the rubber and tungsten particles are kneaded and mixed using an open roll or mixer to obtain a composite material. Then, the composite material is molded into various shapes, such as block, sheet, wire and pipe, using a press, calender roll, extrusion molding machine, or injection-molding machine. Further, the composite material may be molded into a product having a complicated shape, using a transfer-molding machine or injection-molding machine, or embeddingly or integrally moulded with a metal component.

BRIEF DESCRIPTION OF DRAWINGS

FIGS. 1 to 3 schematic diagrams showing the relationship between the particle sizes and packed state of particles used in a composite material, wherein FIG. 1 shows one conventional composite material using only large-size particles;

FIG. 2 shows another conventional composite material using two kinds of particles different in particle size; and FIG. 3 shows a high-density composite material using three kinds of particles different in particle size, according to the present invention.

BEST MODE FOR CARRYING OUT THE INVENTION

EXAMPLE 1

Figure 1:
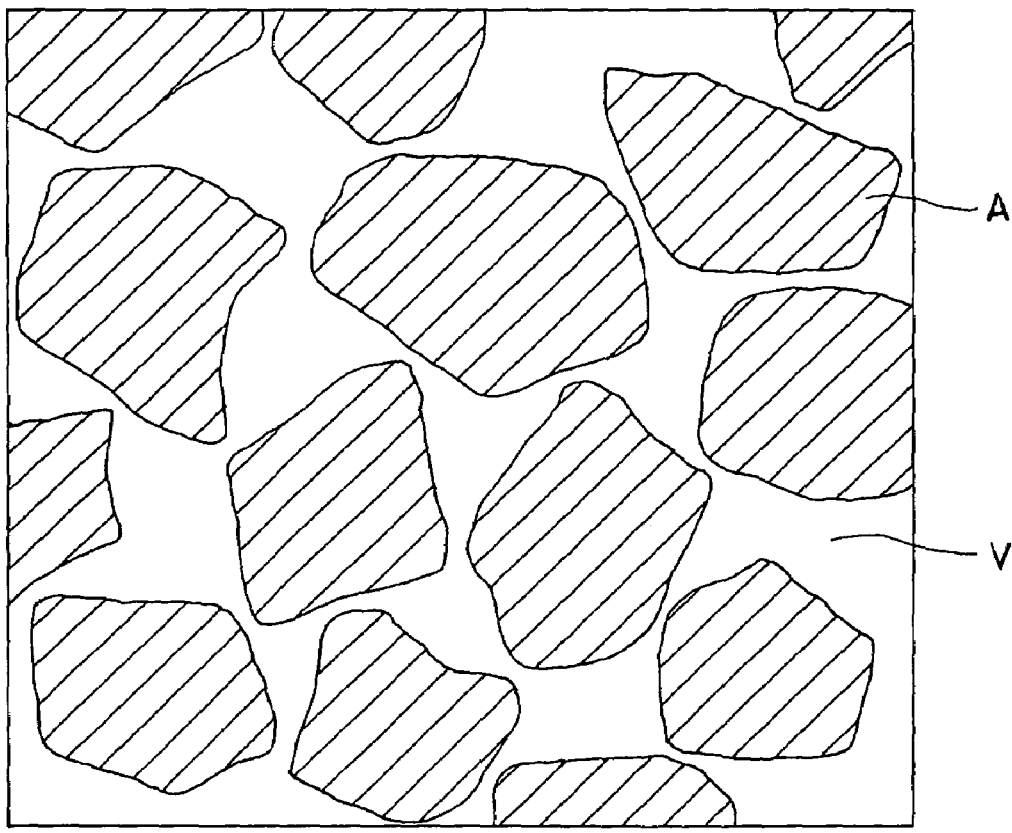
Figure 2:
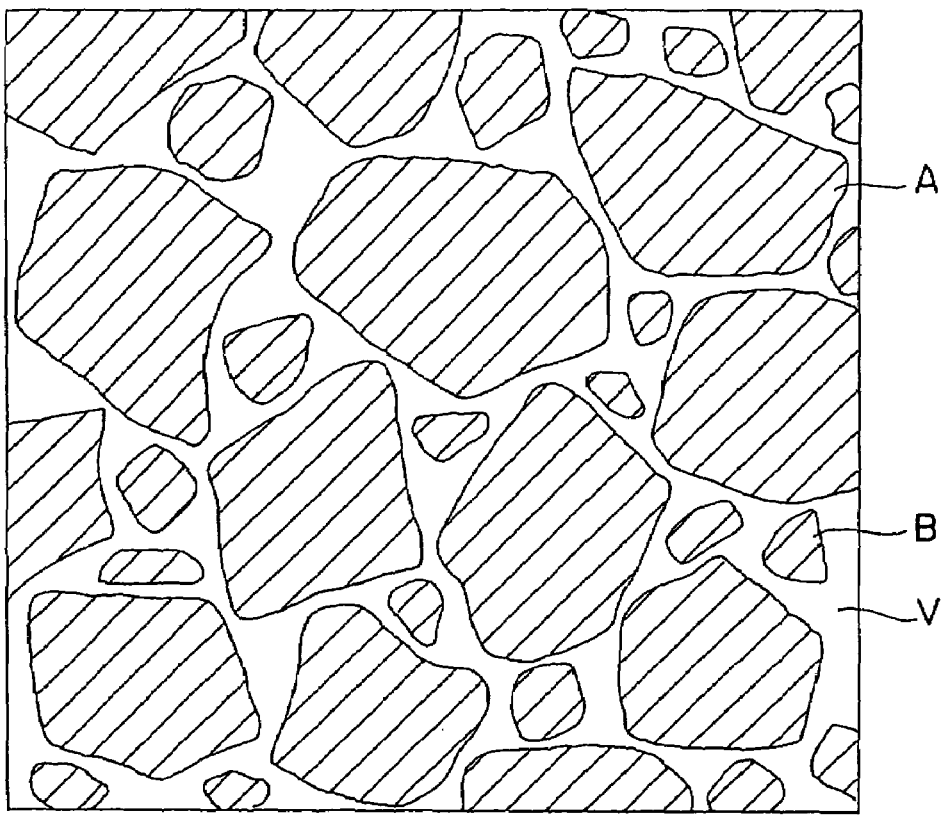
Figure 3:
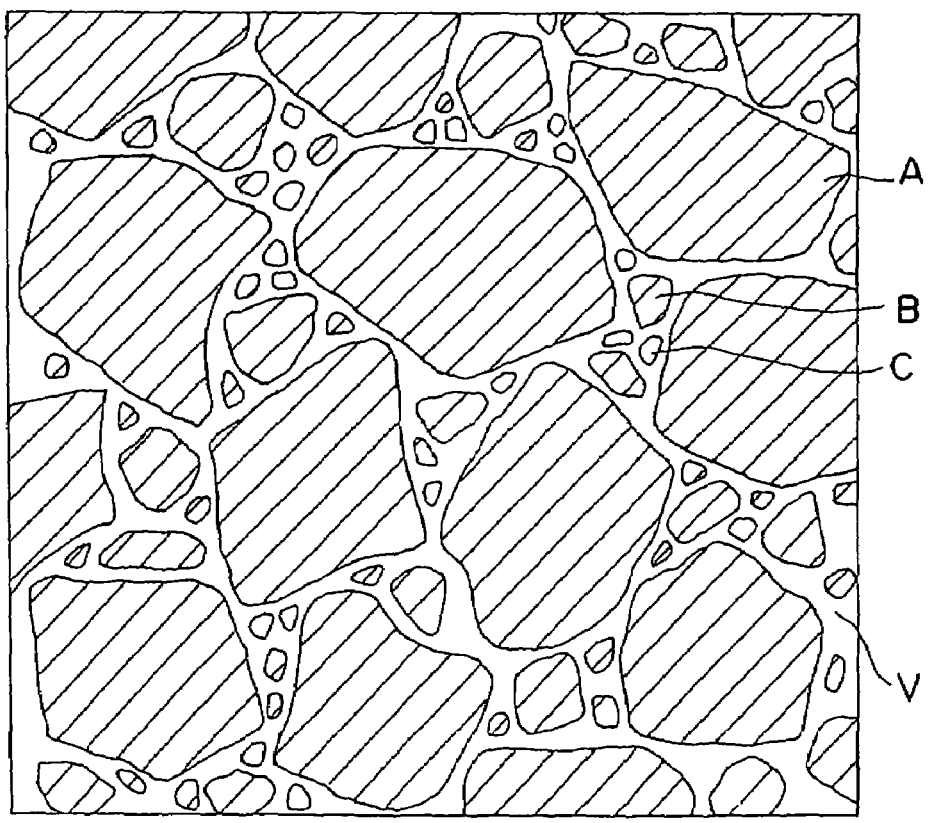

Tungsten particles different in particle size as shown in Tables 1 and 2 were mixed at respective ratios as shown in Tables 1 and 2 to prepare 33 kinds of mixed powders, and each of the mixed powders was sufficiently mixed using a dry-type blender. 59 volume % of each of the tungsten mixed powders and 41 volume % of a styrene-based thermoplastic elastomer "NOF ALLOY IE 205 (available from NOF Co.)" were kneaded at 150° C. for 2 hours using a pressure kneader to form a composite material. Then, each of the obtained composite materials was formed as a sheet-shaped member having a thickness of 1 mm through press molding at 130° C. In this manner, Sample Nos. 1 to 33 were obtained.

In Tables 1 and 2, Sample Nos. 1 to 8 each having the single-digit sample number are examples of the present invention (hereinafter referred to as "Inventive Sample"), and other Sample Nos. 10 to 33 each having the single-digit sample number and the mark * are comparative samples out of the range defined by the present invention (hereinafter referred to as "Comparative Sample").

Inventive Sample Nos. 1 to 5 and Comparative Sample Nos. 10 to 25 are composite materials each comprising the elastomer and the particles classified as tungsten particles.

Inventive Sample Nos. 6 to 8 and Comparative Sample Nos. 26 to 33 are composite materials each prepared by using particles each having an average particle size with a center specified by a desired particle size.

In Tables 1 and 2, "1 μm-2 μm", "2 μm-3 μm", "3 μm-6 μm", "6 μm-10 μm" and "10 μm-100 μm" mean "from 1 μm to 2 μm", "from greater than 2 μm to less than 3 μm", "from 3 μm to 6 μm", "from greater than 6 μm to less than 10 μm" and "from 10 μm to 100 μm", respectively.

In Inventive Samples, the sheets of Sample Nos. 1 to 5 using the classified particles had a density of greater than 10 g/cm$^3$, and enhanced flexibility. Through the SEM observation of the sections of these Inventive Samples using a scanning electron microscope, it was verified that particles are uniformly dispersed over the elastomer, and the medium-size and small-size particles are packed in the spaces between the large-size particles. Through measurements of the radiation absorption characteristic in an X-ray of 6 MV, it was verified that each of the Inventive Sample Nos. 1 to 5 with a density of greater than 10 g/cm$^3$ has a radiation-shielding performance superior to lead alloys. Specifically, each of the Inventive Sample Nos. 1 to 5 had an X-ray absorbency which is about 106% of a lead alloy sheet having the same thickness as that of the Inventive Sample Nos. 1 to 5, and about 2.5 times of a commercially available lead-contained sheet having a density of 4 g/cm³ and the same thickness as that of the Inventive Sample Nos. 1 to 5.

Comparative Sample Nos. 10 to 14 are composite materials prepared by using the elastomer and only one kind of the classified particles. Each of the classified particles has a similar particle size, and thereby one of the particles is never packed in the space between two of the remaining particles. Thus, Comparative Sample Nos. 10 to 14 cannot have a sufficient density. Further, Comparative Sample using smaller-size particles had a lower density than that of Comparative Sample using larger-size particles due to the lager specific surface area of each of the smaller-size particles.

Comparative Sample Nos. 15 to 25 are composite materials prepared by using the elastomer and plural kinds of the classified particles. Each of these Comparative Samples contains the medium-size and/or small-size particles at an insufficient or excessive volume % which is not to allow the medium-size and/or small-size particles to be adequately packed in the spaces between the large-size particles. Thus, none of the Comparative Sample Nos. 15 to 25 could have a sufficient density due to remaining spaces or spaces caused by the contacts between the medium-size and/or small-size particles.

Each of the aforementioned samples shows an example using the classified particles. While the classified particles can facilitate the control in the mixing process, it involves a high production cost. Thus, in view of cost performance, it is practical to use a mixed powder prepared by mixing plural kinds of particles each having a controlled average particle size.

Each of Inventive Sample Nos. 6 to 8 and Comparative Sample Nos. 26 to 33 shows an example of preparing a sample by using particles each having an average particle size with a center specified by a desired particle size. Differently from the samples using the classified particles, each of these Samples contains several to several ten volume % of particles each having a particle size greater or less than the range of the desired particle size.

As compared to Inventive Sample Nos. 1 to 5 and Comparative Sample Nos. 1 to 25 which use the classified particles, each of Inventive Sample Nos. 6 to 8 which use particles each having a particle size defined by an average particle size has a slightly low density but a sufficient density of 10 g/cm³. As to other properties, Inventive Sample Nos. 6 to 8 exhibited sufficient characteristics. Through the observation of their structure, it was verified that the medium-size and small-size particles are packed in the spaces between the large-size particles. In contract, none of Comparative Sample Nos. 26 to 33 which use particles each having a particle size defined by the same average particle size could have a desired density. Through the observation of their structure, it was verified that there is no regularity in the arrangement of the particles, and some aggregates of the particles each having a similar particle size.

As the result of a bending test, all of Samples Nos. 1 to 33 in Tables 1 and 2 exhibited enhanced flexibility. Further, some aggregates of the particles each having a similar particle size were observed in all of Samples Nos. 1 to 33. As the result of the bending test, while each of Inventive Samples exhibited excellent bendability, each of Comparative Samples had cracks.

EXAMPLE 2

As shown in Table 3, this example shows the comparison between the effect of the elastomer and vulcanized rubber to be mixed with the tungsten particles and the effect of other resins.

Tungsten particles classified at 10 to 20 μm as large-size particles, tungsten particles classified at 4 to 5 μm as medium-size particles and tungsten particles classified at 1 to 2 μm as small-size particles were quantified, respectively, at 70 volume %, 15 volume % and 15 volume %, and sufficiently mixed using a dry-type blender to obtain a tungsten mixed powder.

Sample Nos. 101 to 103 are examples of the present invention (hereinafter referred to as "Inventive Sample"), and other Sample Nos. 111 and 112 each having the mark * are comparative samples using polystyrene and ABS resin, respectively (hereinafter referred to as "Comparative Sample"). "JELLYCAST JC-1000-N (available from Kuraray Trading Co., Ltd.)" was used as a polystyrene-based elastomer for Inventive Sample No. 101, and "NOF ALLOY IE 205 (available from NOF Co.)" was used as an olefin-based thermoplastic elastomer for Inventive Sample No. 102. Except for Inventive Sample No. 103, each ratio of the remaining Samples was quantified to allow an intended composite material to have a density of 11.5 g/cm³. Then, using a pressure kneader, Inventive Samples were kneaded at 130 to 140° C. for 3 hours, and Comparative Samples were kneaded at 200 to 220° C. for 3 hours, so as to prepare sheet-shaped member each having a thickness of 1 mm.

In Inventive Sample No. 103, with respect to the total volume of the tungsten particles, 60 volume % of large-size particles classified at 50 to 100 μm, 10 volume % of medium-size particles classified at 3 to 6 μm, and 20 volume % of small-size particles classified at 1 to 2 μm were prepared, and three kinds of particles were mixed to form a tungsten mixed powder. the obtained tungsten mixed powder, and the total of the natural rubber, a vulcanizing agent and a vulcanization accelerator were quantified, respectively, at 51 volume % and 49 volume %, and masticated using an open roll to form a composite material. Then, the composite material was molded through a vulcanizing press at 160° C. to prepare a sheet-shaped member having a thickness of 1 mm.

Each of the obtained sheets using Inventive Sample Nos. 101 and 102 had a high density of 11.8 g/cm³, and exhibited enhanced flexibility. These sheets also exhibited a tensile strength of 6 MPa. The sheet using Inventive Sample No. 103 had high density, enhanced flexibility and high tensile strength (20 MPa).

By contrast, in the sheet using Comparative Sample No. 111, a part of the tungsten particles were not in contact with the polystyrene and packed in the form of particles themselves due to the insufficient quantity of the polystyrene relative to the spaces between the tungsten particles. In the sheet using Comparative Sample No. 112, a part of the tungsten particles were packed in the form of particles themselves.

EXAMPLE 3

The composite materials and sheets obtained in Inventive Sample Nos. 1 to 3 were formed as a fishing weight. The obtained fishing weight had a density equivalent to lead, and excellent deformability to provide enhanced usability as weights. Further, even if the weight was detached from a line and dropped down to the water, the missing weight did not bring any pollution to the water.

EXAMPLE 4

The composite materials and sheets obtained in Inventive Sample Nos. 1 to 3 were formed as a vibration-insulating member for use as a mat to be put under a domestic refrigerator. The vibration-insulating member could significantly reduce vibrations transmitted from a refrigerator to a floor or lower story.

EXAMPLE 5

The composite materials and sheets obtained in Inventive Sample Nos. 1 to 3 were formed as a balance member for a rooter of a helicopter. The sheet has enhanced workability as compared to lead or heavy metal. Thus, the balance member could be readily fine-adjusted to allow an adjusting operation to be completed in a short time.

EXAMPLE 6

The composite materials and sheets obtained in Inventive Sample Nos. 1 to 3 were formed as a shielding curtain for baggage-screening equipment using X-rays. The shielding curtain provided enhanced shielding effect as compared to a lead-contained curtain. The harmless property allowed the shielding curtain to be used in fool-related locations.

EXAMPLE 7

An IC chip heat-dissipation spacer was formed from a high-density composite material prepared by using 60 volume % of W particles having the particle size mix of Inventive Sample No. 1 and 40 volume % of olefin-based elastomer (NOF ALLOY IE 205, available from NOF Co.). The obtained heat-dissipation spacer had high density as in Inventive Sample No. 1, excellent heat conductivity. Further, by taking advantage of enhanced flexibility, the heat-dissipation spacer could be brought into close contact with components to exhibit excellent hest-dissipation characteristic.

EXAMPLE 8

A composite material was prepared by using 56 volume % of W particles having the particle size mix of Inventive Sample No. 1 and 44 volume % of styrene-based elastomer (JELLYCAST, available from Kuraray Trading Co., Ltd.). By taking advantage of excellent high density, the composite material was formed as a slug for shotguns. The slug had no problem of environmental ground pollution and harmful affect on animals.

INDUSTRIAL APPLICABILITY

The high-density composite material of the present invention has a density of 10 g/cm$^3$, no hazardous property, high radiation-shielding performance, excellent formability/workability, excellent handleability/usability and enhanced flexibility. Thus, the high-density composite material is usable as a material even for a member to be used at a movable region having a complicated shape, such as a curved surface, and useful as a material for nuclear-radiation-shields, vibration-insulating members, weight member or balance members.

In addition to the above characteristics, the high-desity composite material of the present invention exhibits excellent characteristic as a high head-conductive heat-dissipation material. Thus, the high-density composite material can be applied to electronic components requiring a heat-dissipation characteristic, and anti-electrostatic discharge (ESD) materials.

Further, the high-density composite material can be used as the material of slugs for use in hunting, trapshooting or the like.

TABLE 1

| | Particle Size & Mixing Ratio (volume %) | | | | | | | |
|---|---|---|---|---|---|---|---|---|
| Sample No. | less than 1 μm | 1-2 μm | 2-3 μm | 3-6 μm | 6-10 μm | 10-100 μm | greater than 100 μm | Density (g/cm$^3$) |
| 1 | 0 | 15 | 0 | 15 | 0 | 70 | 0 | 11.7 |
| 2 | 0 | 10 | 0 | 10 | 0 | 80 | 0 | 11.4 |
| 3 | 0 | 20 | 0 | 20 | 0 | 60 | 0 | 11.2 |
| 4 | 0 | 20 | 0 | 10 | 0 | 70 | 0 | 10.8 |
| 5 | 0 | 10 | 0 | 20 | 0 | 70 | 0 | 11.0 |
| 6 | 1 | 13 | 2 | 13 | 4 | 65 | 2 | 10.3 |
| 7 | 3 | 18 | 5 | 10 | 5 | 60 | 1 | 10.8 |
| 8 | 6 | 13 | 7 | 12 | 7 | 60 | 5 | 11.4 |
| *10 | 100 | 0 | 0 | 0 | 0 | 0 | 0 | 7.5 |
| *11 | 0 | 100 | 0 | 0 | 0 | 0 | 0 | 8.2 |
| *12 | 0 | 0 | 0 | 0 | 100 | 0 | 0 | 8.3 |
| *13 | 0 | 0 | 0 | 0 | 0 | 100 | 0 | 8.4 |
| *14 | 0 | 0 | 0 | 0 | 0 | 0 | 100 | 8.4 |
| *15 | 0 | 8 | 7 | 15 | 0 | 70 | 0 | 9.6 |
| *16 | 15 | 0 | 0 | 15 | 0 | 70 | 0 | 9.5 |
| *17 | 0 | 0 | 5 | 15 | 10 | 70 | 0 | 9.2 |
| *18 | 15 | 15 | 0 | 0 | 0 | 70 | 0 | 8.1 |
| *19 | 0 | 15 | 0 | 0 | 15 | 70 | 0 | 9.7 |
| *20 | 0 | 0 | 15 | 0 | 0 | 70 | 15 | 9.6 |

TABLE 2

| Sample No. | less than 1 μm | 1-2 μm | 2-3 μm | 3-6 μm | 6-10 μm | 10-100 μm | greater than 100 μm | Density (g/cm³) |
|---|---|---|---|---|---|---|---|---|
| *21 | 0 | 15 | 0 | 15 | 70 | 0 | 0 | 8.7 |
| *22 | 70 | 15 | 0 | 15 | 0 | 0 | 0 | 7.9 |
| *23 | 0 | 15 | 12 | 15 | 0 | 58 | 0 | 9.7 |
| *24 | 12 | 15 | 0 | 15 | 0 | 58 | 0 | 9.8 |
| *25 | 0 | 9 | 0 | 9 | 0 | 82 | 0 | 9.9 |
| *26 | 15 | 45 | 16 | 14 | 5 | 4 | 1 | 7.4 |
| *27 | 5 | 15 | 18 | 27 | 25 | 8 | 2 | 8.1 |
| *28 | 0 | 0 | 0 | 3 | 9 | 80 | 8 | 9.2 |
| *29 | 2 | 12 | 9 | 8 | 7 | 46 | 16 | 9.4 |
| *30 | 12 | 19 | 12 | 15 | 10 | 27 | 5 | 8.7 |
| *31 | 8 | 8 | 18 | 40 | 16 | 6 | 4 | 8.8 |
| *32 | 5 | 7 | 14 | 14 | 22 | 25 | 13 | 9.3 |
| *33 | 2 | 9 | 9 | 9 | 15 | 55 | 1 | 9.6 |

TABLE 3

| Sample No. | Elastomer, Rubber or Other Organic Material | Density (g/cm³) | Evaluation on Flexibility |
|---|---|---|---|
| 101 | styrene-based elastomer | 11.5 | Good |
| 102 | olefin-based elastomer | | Good |
| 103 | natural rubber | | Good |
| *111 | polystyrene | | (kneading NG) |
| *112 | ABS resin | | (kneading NG) |

What is claimed is:

1. A composite material having a density of at least 10 g/cm³, comprising an elastomer or vulcanized rubber, and high-density particles dispersed over said elastomer or vulcanized rubber,
   wherein said clastomer or vulcanized rubber and said high-density particles are contained, respectively, at 35 to 50 volume % and 50 to 65 volume % with respect to the total volume of said composite material, and
   said high-density particles made of tungsten (W) and comprising:
   60 to 80 volume % of first particles cach having a particle size in the range of 10 to 100 μm;
   10 to 20 volume % of second particles each having a particle size in the range of 3 to 6 μm; and
   10 to 20 volume % of third particles each having a particle size in the range of 1 to 2 μm,
   wherein said second and third particles are packed in respective spaces between said first particles, and wherein said elastomer or vulcanized rubber forms a network around said packed particles while maintaining its elasticity and extensibility to keep up the flexibility of said composite material.

2. The composite material as defined in claim 1, wherein said elastomer is a styrene-based thermoplastic elastomer or an olefin-based thermoplastic clasromer.

3. The composite material as defined in claim 1, wherein the respective particle sizes of said high-density particles are based on a given classification.

4. The composite material as defined in claim 1, which has a surthee electrical resistance in the range of $10^2$ to $10^9$ Ω·cm.

5. The composite material as defined in claim 1, which is used as a material in shape of a sheet.

6. The composite material as defined in claim 1, which is used as a material of a weight member.

7. The composite material as defined in claim 1, which is used as a vibration-insulating material.

8. The composite material as defined in claim 1, which is used as a material of a balance member.

9. The composite material as defined in claim 1, which is used as a nuclear-radiation-shielding material.

10. The composite material as defined in claim 1, which is used as a heat-dissipation material.

11. The composite material as defined in claim 1, which is used as a material of a slug.

* * * * *